United States Patent [19]
Hall et al.

[11] Patent Number: 5,236,649
[45] Date of Patent: * Aug. 17, 1993

[54] EXTRUDABLE THERMOPLASTIC PARTICULATES

[75] Inventors: Mark J. Hall, Midland, Mich.; Stephen R. Betso, Lake Jackson, Tex.; Duane F. Foye, Merrill, Mich.; Kun S. Hyun, Midland, Mich.; Steven R. Jenkins, Midland, Mich.; Donald E. Kirkpatrick, Midland, Mich.; Paul T. Louks, Saginaw, Mich.; James A. Stevenson, Pittsburgh, Pa.

[73] Assignee: The Dow Chemical, Midland, Mich.

[*] Notice: The portion of the term of this patent subsequent to Apr. 9, 2008 has been disclaimed.

[21] Appl. No.: 760,548

[22] Filed: Sep. 16, 1991

Related U.S. Application Data

[63] Continuation-in-part of Ser. No. 259,936, Dec. 23, 1988, abandoned.

[51] Int. Cl.$^5$ ............................................. B29B 9/12
[52] U.S. Cl. ..................... 264/130; 156/244.24; 264/131; 264/140; 264/171; 264/211; 264/328.17; 264/331.15; 427/222; 428/378; 428/403; 428/407; 524/568; 526/343
[58] Field of Search ............... 264/171, 211, 130, 131, 264/331.15, 328.17, 210.6, 140–144, 300; 427/222; 428/378, 403, 407; 526/343; 524/568; 525/239; 156/244.24

[56] References Cited

U.S. PATENT DOCUMENTS

| | | | |
|---|---|---|---|
| 3,355,404 | 11/1967 | Ruffing et al. | |
| 3,557,265 | 1/1971 | Chisholm et al. | 264/171 |
| 3,669,722 | 6/1972 | Bishop | 264/144 |
| 3,758,656 | 9/1973 | Shih | 264/144 |
| 4,079,115 | 3/1978 | Settineri et al. | 264/331.15 |
| 4,203,880 | 5/1980 | Stoloff et al. | 264/300 |
| 4,622,193 | 11/1986 | Kresge et al. | 264/141 |
| 4,722,816 | 2/1988 | Ueno et al. | 264/211 |
| 4,753,760 | 6/1988 | Kawaguchi et al. | 264/130 |
| 4,766,202 | 8/1988 | DeLassus et al. | 264/331.15 |
| 4,769,289 | 9/1988 | Kelly et al. | 264/211 |
| 5,006,368 | 4/1991 | Louks | 427/222 |

Primary Examiner—Jeffery Thurlow

[57] ABSTRACT

The present invention is a coated particulate in the form of a powder or in the form of a pellet, the particulate comprising a vinylidene chloride interpolymer and being coated with at least one processing aid at a level effective to improve the extrudability of the vinylidene chloride interpolymer. The processing aid beneficially is selected from the group consisting of fatty esters; wax esters; glycerol esters; glycol esters; fatty alcohol esters, fatty alcohols; fatty amides; metallic salts of fatty acids; olefin polymers and polyolefin waxes.

15 Claims, No Drawings

EXTRUDABLE THERMOPLASTIC PARTICULATES

CROSS-REFERENCE TO RELATED APPLICATION

This Application is a continuation-in-part of the co-pending application Ser. No. 259,936, filed Dec. 23, 1988 now abandoned.

FIELD OF THE INVENTION

The present invention relates to thermoplastic particulates having improved extrusion properties.

BACKGROUND OF THE INVENTION

A variety of useful articles may be formed using thermally sensitive polymers, such as vinylidene chloride interpolymers. In the past, the practice generally was to extrude the vinylidene chloride interpolymer directly from the powder form in which it is recovered after polymerization. Because of the convenience of shipping and handling, it is desirable to form the vinylidene chloride interpolymer into pellets prior to final extrusion.

With the demand for increased extrusion rate, the processing conditions to which particulates are exposed have become more demanding. When melt processed, conventional particulates of vinylidene chloride interpolymers have a tendency to generate particulate degradation products (i.e., carbonaceous material, gels, or fish eyes) in the extrudate, particularly when the vinylidene chloride interpolymer is exposed to relatively long residence times in the melt processing equipment.

To control the generation of particulate degradation products during melt processing, processing aids such as lubricants (e.g., internal and external types), olefinic waxes and oils, and polyolefins have been blended with the vinylidene chloride interpolymer prior to fabrication into a final product. However, it has been found that, after exposure to desirable processing temperatures, a certain lag time exists before the blended processing aids function effectively. It is during this lag time in the melt processing equipment that the vinylidene chloride interpolymer is particularly susceptible to decomposition.

It is desirable to produce a particulate of a vinylidene chloride interpolymer which is capable of being extruded, in either powder or pellet form, without having an unacceptable level of degradation products in the extrudate. It is to this goal that the present invention is directed.

SUMMARY OF THE INVENTION

The present invention concerns a coated particulate of extrudable thermoplastic material, the particulate comprising vinylidene chloride interpolymer, and being coated with at least one processing aid at a level effective to improve the extrudability of the vinylidene chloride interpolymer.

DETAILED DESCRIPTION OF THE INVENTION

The inventors have discovered that making a particulate of a vinylidene chloride interpolymer having a processing aid coated on its surface, improves the extrudability of the vinylidene chloride interpolymer. The particulates of the present invention are considered to possess improved extrudability, i.e., less carbonaceous material contamination on the melt processing equipment, e.g., on an extruder screw heel: and a lower mechanical energy to extrude, i.e., amount of energy expended to extrude the interpolymer due to friction and the viscosity of the polymeric composition, than a particulate formed solely from vinylidene chloride interpolymer.

For the purposes of this invention, it is understood that the term "vinylidene chloride interpolymer" encompasses homopolymers, copolymers, terpolymers, etc. of vinylidene chloride.

The vinylidene chloride may be copolymerized with another monoethylenically unsaturated monomer. Monoethylenically unsaturated comonomers suitable for copolymerization with vinylidene chloride include vinyl chloride, alkyl acrylates, alkyl methacrylates, acrylic acid, methacrylic acid, itaconic acid, acrylonitrile, and methacrylonitrile. The monoethylenically unsaturated comonomers are desirably selected from the group consisting of vinyl chloride, alkyl acrylates, and alkyl methacrylates; the alkyl acrylates and alkyl methacrylates having from about 1 to about 8 carbon atoms per alkyl group, preferably from about 1 to about 4 carbon atoms per alkyl group. The alkyl acrylates and alkyl methacrylates are most preferably selected from the group consisting of methylacrylate, ethylacrylate, and methyl methacrylate.

The monomer mixture comprises a vinylidene chloride monomer generally in the range of from about 60 to about 99 weight percent and the monoethylenically unsaturated comonomer in an amount of from about 40 to about 1 weight percent, said weight percents being based on total weight of the vinylidene chloride interpolymer. The preferred ranges are dependent upon the monoethylenically unsaturated comonomer copolymerized therewith, each are well-known to one skilled in the art.

Methods of forming the vinylidene chloride interpolymers suitable for use in the present invention are well-known in the prior art. The vinylidene chloride interpolymer is generally formed through an emulsion or suspension polymerization process. Exemplary of such processes are U.S. Pat. Nos. 2,558,728; 3,007,903; 3,642,743: and 3,879,359; and the methods described by R. A. Wessling, in *Polyvinylidene Chloride*. Gordon and Breach Science Publishers, New York, 1977, Chapter 3; all of which are incorporated herein by reference.

Beneficially, in the extrusion of the vinylidene chloride interpolymers, it is frequently advantageous and beneficial to incorporate additives well-known to those skilled in the art. Exemplary of additives which may be incorporated in the package are light stabilizers such as hindered phenol derivatives: pigments such as titanium dioxide and the like, plasticizers, lubricants, extrusion aids and the like. Each of these additives is known and several types of each are commercially available. The additives may be incorporated by methods such as conventional melt blending and dry blending techniques.

The thermoplastic particulate may be in the form of a powder or in the form of a pellet.

If the thermoplastic particulate is in powder form, the average particle diameter of the powder is preferably at least about 50 μm, more preferably at least about 100 μm, and most preferably at least about 180 μm; and is preferably at most about 762 μm (1/32 inch), more preferably at most about 500 μm, and most preferably at most about 350 μm. Of course, the application of a coating may change the particle dimensions.

Methods of forming the polymeric composition into pellets are well-known to those skilled in the art. Any method capable of forming the polymeric composition into pellets is suitable for use in the present invention. For the purposes of this invention, the terms "pellet" or "pellets" refer to particles having a minimum cross-sectional dimension of at least 1/32 inch, preferably of at least 1/16 inch, and most preferably of at least ⅛ inch; said pellets suitably have a maximum cross-sectional dimension of at least ½ inch, beneficially of at least ⅜ inch, and preferably of at least ¼ inch. An exemplary method of forming the polymeric composition into pellets includes extruding the polymeric composition through a strand die to form an extruded strand, and chopping the extruded strand into pellets. Other methods include under water cutting, dicing, and die face cutting.

Covering at least a portion of the particle surface is a coating of at least one processing aid. By "processing aid" is meant any component which is employed to improve extrusion performance. These include lubricants (e.g., internal and external types), olefinic waxes and oils, and polyolefins. Although not intended to be bound by theory, it is believed that by applying the processing aid to the surface of the particles, the processing aid will, during melt processing, rapidly migrate to the metal surface of the melt processing equipment. The processing aid will form a film between the polymer and the heated metal surface of the extruder, mill or other equipment used to process the polymer composition. This film significantly reduces the tendency of the molten interpolymer to adhere to these metal surfaces and degrade. In addition, solid state friction is reduced, or can be modified. Friction is a surface phenomena and thus a processing aid on the surface is more effective than in the bulk.

The rapid migration of the processing aid provides relatively fast functioning compared to conventionally compounded processing aids, which require particulate melting prior to functioning. Consequently, a lower amount of the processing aid is necessary to achieve equivalent effects to the same processing aid blended with the vinylidene chloride interpolymer.

The coating is formed by applying the processing aid onto at least a portion of the surface of the vinylidene chloride particles. Generally, the processing aid will be coated on the vinylidene chloride interpolymer surface in an amount of between about 0.001 weight percent to about 2 weight percent, based on the total weight of the particles. Preferably, the processing aid will be coated on the vinylidene chloride interpolymer surface in an amount of between about 0.01 weight percent to about 1.5 weight percent, based on the total weight of the particles. Most preferably, the processing aid will be coated on the vinylidene chloride interpolymer surface in an amount of between about 0.1 weight percent to about 0.7 weight percent, based on the total weight of the particles. Within the prescribed ranges, the choice of optimum amounts of processing aids will be dependent upon the processing aid selected, the viscosity of the processing aid, the size of the particle, and the type and size of the equipment through which the particle is extruded, and other parameters known to those of ordinary skill in the art.

Generally, within the prescribed weight percentage ranges of processing aids which are coated on the vinylidene chloride interpolymer surface, higher levels of processing aid which are coated on the vinylidene chloride interpolymer surface will provide more benefit in terms of decreased particulate degradation in the extrudate. That is to say, when compared to uncoated particles, 50 percent coverage of a vinylidene chloride interpolymer surface will produce somewhat decreased particulate degradation of the extrudate. Moreover, 90 percent coverage of the same particles will produce a still further improvement, as compared with 50 percent coverage of a particles, in decreasing the particulate degradation in the extrudate.

Preferably, the processing aid will be uniformly coated on the vinylidene chloride interpolymer particulate surface. Similarly, within the ranges discussed above, the thicker the surface coating, the more benefit one will see in terms of decreasing the particulate degradation in the extrudate. If, however, the processing aid is applied in quantities excessive for the processing aid selected, the viscosity of the processing aid, the average diameter of the particles, and the type and size of the equipment through which the particulate is extruded, then feeding of the particulate into the melt processing equipment may be impaired because of insufficient friction in the feed zone; or the excess amount of processing aid may form globules on the vinylidene chloride interpolymer surface.

The processing aids coated on the vinylidene chloride interpolymer surface are those generally used for the conventional melt processing of vinylidene chloride interpolymers in either powder or pellet form. The specific processing aid selected will be a matter of choice for the skilled artisan, depending upon a variety of factors. Exemplary factors in selecting a processing aid include melt adhesion requirements, fusion delay requirements, viscosity reduction requirements, friction reduction, and the rate increase desired for a selected extruder screw rpm.

Exemplary processing aids include lubricants, and olefin polymers. Preferably, the processing aid should be selected to have a softening point between ambient temperatures and below the processing temperature of the plastic particles.

Suitable lubricants include both internal and external lubricants which improve extrusion performance of the vinylidene chloride interpolymer. By "internal lubricant" is meant any of the class of compounds that increase the ease with which the polymer molecules slip past one another, resulting in reduced melt viscosity, better flow, and a lower energy to extrude for melt processing. The lubricants may perform functions in addition to that mechanism referred to as internal lubrication By "external lubricant" is meant any of the class of compounds that will migrate to the surface of the molten vinylidene chloride interpolymer and form a film between the interpolymer and the heated metal surface of the extruder, mill or other equipment used to process the particles. This film significantly reduces the tendency of the polymer to adhere to these metal surfaces and degrade. The compositions may perform functions in addition to that mechanism referred to as external lubrication. Although not intended to be bound by theory, the lubricants are classified as "external" because they are believed to be at least partially incompatible with the molten polymer.

Exemplary lubricants include fatty acids (e.g., stearic acid); esters (e.g., fatty esters, wax esters, glycerol esters, glycol esters, fatty alcohol esters, and the like); fatty alcohols (e.g., n-stearyl alcohol); fatty amides (e.g., N,N'- ethylene bis stearamide); metallic salts of fatty acids (e.g., calcium stearate, magnesium stearate, and sodium stearate, sodium lauryl sulfate, and the like); polyolefin waxes (e.g., paraffinic, nonoxidized and oxidized polyethylene and the like).

The term "olefin polymer" includes homopolymers and copolymers of α-monoolefins and substituted α-monoolefins, particularly α-monoolefins or substituted α-monoolefins having from 4 to 12 carbon atoms.

Exemplary α-monoolefins polymers include polyethylene (e.g., ultra-low density polyethylene, low density polyethylene, linear low density polyethylene, medium density polyethylene, high density polyethylene); polypropylene; poly(butene-1), poly(isobutylene); poly(1-pentene); poly(1-hexene); and poly(1-octene).

Substituted α-monoolefins include those wherein the substituents can be halo, alkyl or haloalkyl having from 1 to 12 carbon atoms; carboxylic acid having from 3 to 8 carbon atoms; alkyl or haloalkyl ester of carboxylic acid wherein alkyl or haloalkyl has from 1 to 12 carbon atoms; α-alkenyl having 2 to 12 atoms; acyl having 1 to 12 carbon atoms; carboxylate having from 1 to 12 carbon atoms; alkoxyl having from 1 to 12 carbon atoms, and aryloxy having from 6 to 12 carbon atoms.

The α-monoolefins and substituted α-monoolefins may also be copolymerized with a variety of suitable comonomers such as carboxylic acids having from 3 to 8 carbon atoms (e.g., ethylene vinyl acetate, and ethylene acrylic acid); alkyl or haloalkyl esters of carboxylic acid wherein alkyl or haloalkyl has from 1 to 12 carbon atoms; α-alkenyls having 2 to 12 atoms; acyls having 1 to 12 carbon atoms; carboxylates having from 1 to 12 carbon atoms; alkoxyls having from 1 to 12 carbon atoms, aryloxys having from 6 to 12 carbon atoms; and α-monoolefin/α-monoolefin copolymers (e.g., ethylene/propylene copolymers).

Preferably, the olefin polymers selected are those which lower the mechanical energy to extrude and the frictional coefficient of the polymeric composition.

Due to friction and the viscosity of the polymeric composition, mechanical energy to extrude is the amount of energy expended when extruding the interpolymer. It defines the amount of energy which has been viscously and frictionally dissipated to the polymer during extrusion. A detailed discussion of mechanical energy to extrude is set forth in Principles of Polymer Processing, Tadmor, Z., and Gogos, C., Chapter 12, Wiley and Sons, (1979).

More preferably, the frictional coefficient of the polymeric composition should be at least about 20 percent lower than the frictional coefficient of the polymeric composition without the polyolefin. One method of measuring friction is by impinging a sample of known cross-section on a rotating roll. The ratio of the tangent force to the radial impinging force is defined as the coefficient of friction. An apparatus called a "screw simulator" is used to allow the measurement of COF at conditions normally found in an extruder feed section. The apparatus and process is described in detail in the following article which is hereby incorporated by reference: C. I. Chung et al., Polym. Eng. Sci., 17(1), 9 (1977).

Viscosity is the resistance to flow. Viscosity is a function of many variables including molecular weights with higher molecular weight polymers having higher viscosities.

Most preferably, the polyolefins are those selected to have a viscosity in the range of about 200 percent to about 5 percent of the vinylidene chloride interpolymer.

The method of applying the processing aid will, obviously, depend upon the physical form of the processing aid. When in powder form, the processing aid may be applied directly to the vinylidene chloride interpolymer surface. Suitable techniques for applying the powder include softening the vinylidene chloride interpolymer surface prior to application of the powder, or by dispersing the powder in a carrier prior to application. When a carrier is employed, the powder may be blended with the carrier and applied concurrently on the vinylidene chloride interpolymer surface, or may be consecutively applied after the carrier is applied on the vinylidene chloride interpolymer surface. Suitable carriers include mineral oil.

When in solid or wax form, the processing aid may be prepared for coating the solid or wax on the vinylidene chloride interpolymer surface by exposing the solid or wax to a temperature sufficient to cause it to soften and become tacky or liquid. The softened solid or wax may then be applied to the vinylidene chloride interpolymer surface by any suitable means. Exemplary means for applying the lubricant to the vinylidene chloride interpolymer surface are by means of spraying, tumble blending, or by high intensity blending.

A particularly preferred technique for applying a processing aid, regardless of its physical form, to the vinylidene chloride interpolymer surface is by using high intensity blending and is disclosed in U.S. Pat. No. 5,006,368, which is hereby incorporated by reference. The patent teaches that plastic pellets are prepared for coating by mixing them with at least one processing aid in a high intensity blender. The pellets are mixed until they are brought to a temperature at least about 10° C., preferably about 5° C., below the temperature at which the processing aid will soften and fuse. Persons skilled in the art recognize that mixing times will vary with the blending technique, apparatus, and the selected processing aid. The processing aid is then charged in the blender and further mixing of the preheated pellet and processing aid continued until the processing aid fuses on the vinylidene chloride interpolymer surface. Exemplary high intensity blenders include Banbury mixers, Prodex-Henschel mixers, Welex-Papenmeier mixers, and the like.

Another technique for making coated particles comprises coextruding the vinylidene chloride interpolymer between layers of the lubricant and then pelletizing the coextruded structure. An exemplary process for such a technique is disclosed in U.S. Pat. No. 3,557,265, which is hereby incorporated by reference. Generally, the patent teaches a method whereby plastic film or sheet having a plurality of layers is formed by deforming a flowing stream having layers of diverse thermoplastic material. The cross-sectional configuration of the plurality of flowing streams is altered by reducing the dimension of the stream in a direction generally perpendicular to the interfaces between the individual streams and by increasing the dimension of the stream in a direction generally parallel to the said interface to provide a sheet of film having a laminar structure.

After being surface coated, the particulate is then melt processed and extruded into any suitable final product. The process of the present invention can be used to form a variety of films or other articles.

The particulate may be fabricated into any suitable final product, e.g., a variety of films or other articles. As is well known in the art, the films and articles are fabricated with conventional coextrusion; e.g, feedblock coextrusion, multimanifold die coextrusion, or combinations of the two; injection molding; co-injection molding; extrusion molding; casting; blowing; blow molding; calendering; and laminating.

Exemplary articles include blown and cast, mono and multilayer, films; rigid and flexible containers; rigid and foam sheet; tubes; pipes; rods; fibers; and various profiles. Lamination techniques are particularly suited to produce multiply sheets. As is known in the art, specific laminating techniques include fusion; i.e., whereby self-sustaining lamina are bonded together by applications of heat and pressure; wet combining, i.e., whereby two or more plies are laminated using a tie coat adhesive, which is applied wet, the liquid driven off, and in one continuous process combining the plies by subsequent pressure lamination; or by heat reactivation, i.e., combining a precoated film with another film by heating, and reactivating the precoat adhesive so that it becomes receptive to bonding after subsequent pressure laminating.

Vinylidene chloride interpolymers are particularly suited for fabrication into rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. The structures have organic polymer skin layers laminated on each side of a vinylidene chloride interpolymer barrier layer, with glue layers generally interposed therebetween.

The present invention is illustrated in further detail by the following examples. The examples are for the purposes of illustration only, and are not to be construed as limiting the scope of the present invention. All parts and percentages are by weight unless otherwise specifically noted.

EXAMPLES

Various components used in the examples are set forth in Table I.

TABLE I

| Code | |
|---|---|
| PVdC Pellet | A pellet containing about 96.5 weight percent of a vinylidene chloride interpolymer; about 1.5 weight percent ethylene vinyl acetate; about 1.2 weight percent tetrasodium pyrophosphate; and about 0.8 weight percent of epoxidized soybean oil. The vinylidene chloride interpolymer is formed from about 99.8 weight percent of a vinylidene chloride copolymer formed from a monomer mixture comprising 80 weight percent vinylidene chloride and about 20 weight percent vinyl chloride; and about 0.2 weight percent of epoxidized soybean oil. The vinylidene chloride copolymer has a major melting point of 162° C. and a weight average molecular weight of 80,000. |
| PA-1 | Magnesium stearate commercially available from Mallinckrodt, Inc., under the trade designation magnesium stearate RSN 1-1. |
| PA-2 | Sodium lauryl sulfate commercially available from Albright and Wilson, Inc., under the trade designation Empicol LZV/E. |
| PA-3 | A poly(ethylene-co-vinyl acetate) containing 28% vinyl acetate, whight is commercially |

TABLE I-continued

| Code | |
|---|---|
| | available from DuPont de Nemours Chemical Co. under the trade designation Elvax 3180. |
| PA-4 | An oxidized polyethylene commercially available under the trade designation as Allied 629A from Allied Corp. The oxidized polyethylene has a density (ASTM Test D-1505) of 0.93 grams per cubic centimeter @ 20° C., a drop point of 104° C., and a Brookfield Viscosity of 200 cps @140° C. |
| PA-5 | A polyethylene wax commercially available from Allied Corp. under the trade designation Allied 617A. The polyethylene wax has a density (ASTM Test D1505) of 0.91 grams per cubic centimeter, a drop point of 102° C., and a Brookfield Viscosity of 180 cps @ 140° C. |

Sample Preparation

Various processing aids are coated on the surface of the PVdC pellets in quantities set forth in Table II. Those processing aids in powder form are coated on the pellet by placing the powder and pellet in a bag and then shaking them. More sophisticated equipment could have been used but was not necessary.

Those processing aids in the form of a wax or solid are coated on the pellet using the following method: the pellets are placed in a high speed blender which is commercially available under the trade designation Welex Model 35 from F. H. Papenmeier K. G. Company. The mixer has a diameter of 35 cm, and a nominal capacity of 1 cubic foot. The baffle of the mixer is adjusted in the radial direction, the impeller is started and maintained at a tip speed of about 2700 feet per minute (fpm). When the pellets temperatures reach 75° C., various processing aids, coded in Table I, are charged in the mixer in quantities set forth in Table II. The pellets and processing aids are blended for a period of about eight minutes and then discharged. The coated pellets are cooled to about 65° C. by circulating air having a temperature of 20° C..

Particulate Degradation Formation Testing

The pellets are extruded through a 2½" extruder having a length to diameter ratio of 21/1. The extruder has the following set temperatures: (a) first zone temperature =174° C.; (b) second zone temperature= 168° C.; (b) third zone temperature =163° C.; and (c) die temperature =165° C..

The decomposition of the extruded resin into carbonaceous material is determined by visually inspecting the carbonaceous material on the root of the extruder screw heel. When evaluating the root of the extruder screw heel, pellets are extruded in a continuous process for a period of about 4 hours. After rapid quench cooling of the extruder while still full of extrudate, the extent of carbonaceous material formation in the transition section of the extruder screw is qualitatively rated. The carbonaceous material buildup is rated on a scale of 0 to 4 over a continuous range, wherein 0 represents generally no visible carbonaceous material on the surface and 4 represents a layer of carbonaceous material generally completely covering the surface.

Results of the physical property tests are set forth in Table II, together with the identity and amount of polymer components employed.

TABLE II

| Example | Pellet[1] | Method of Pellet Coating[2] | Processing Aid[3] Type[a] | % [b] | Particulate Degradation Product[4] |
|---|---|---|---|---|---|
| 1 | PVdC | Bag | PA-1 | 0.25 | 2 |
| 2 | PVdC | Bag | PA-1 | 0.5 | 1 |
| 3 | PVdC | Bag | PA-2 | 0.25 | 1 |
| 4 | PVdC | Bag | PA-2 | 0.5 | 2 |
| 5 | PVdC | Bag | PA-1 | 0.25 | 0 |
|  |  |  | PA-2 | 0.25 |  |
| 6 | PVdC | Blender | PA-3 | 0.1 | 1 |
| 7 | PVdC | Blender | PA-4 | 0.3 | 1 |
| 8 | PVdC | Blender | PA-5 | 0.3 | 2 |

[1] Pellet = pellets as set forth in table 1.
[2] Method of Pellet Coating: (a) "Bag" = placing the powdery processing aid and pellet into a bag and shaking; and (b) "Blender" = placing the waxy or solid processing aid and pellet into a high speed blender.
[3] Processing aid: (a) type = processing aid as set forth in Table 1; and (b) % = the level of processing aid on the vinylidene chloride interpolymer surface in weight percent.
[4] Particulate Degradation Product = carbonaceous material contamination on the extruder screw heel according to visual inspection, on a scale of 0 to 4.

As can be seen from the above table, the coated pellets generate a relatively low level of particulate degradation product.

EXAMPLES 9–16

Examples 1–8 are repeated with the following exceptions. Instead of using the PVdC set forth in Table I, a pellet having the following composition is employed: the pellet contains about 96.5 weight percent of a vinylidene chloride interpolymer; about 1.5 weight percent ethylene vinyl acetate; about 1.2 weight percent tetrasodiuum pyrophosphate; and about 0.8 weight percent of epoxidized soybean oil. The vinylidene chloride interpolymer comprises from about 99.8 weight percent of a vinylidene chloride copolymer formed from a monomer mixture comprising 94 weight percent vinylidene chloride and about 6 weight percent methyl acrylate; and about 0.2 weight percent of epoxidized soybean oil. The vinylidene chloride copolymer has a major melting point of 165° C. and a weight average molecular weight of 90,000.

The coated pellets generate a relatively low level of particulate degradation product.

Although the invention has been described in considerable detail, with reference to certain preferred embodiments thereof, it will be understood that variations and modifications can be affected within the spirit and scope of the invention as described above and as defined in the appended claims.

What is claimed is:

1. A coated particulate, in the form of a powder or in the form of a pellet, of extrudable thermoplastic material, the particulate comprising vinylidene chloride interpolymer, and being coated with at least one processing aid at a level effective to improve the extrudability of the vinylidene chloride interpolymer, said processing aid being selected from the group consisting of fatty esters, wax esters, glycerol esters, glycol esters, fatty alcohol esters, fatty alcohols, fatty amides, metallic salts of fatty acids, olefin polymers and polyolefin waxes.

2. The particulate of claim 1, comprising a vinylidene chloride interpolymer which is formed from a monomer mixture which comprises vinylidene chloride monomer in an amount of from about 60 to about 99 weight percent and at least one ethylenically unsaturated comonomer copolymerizable therewith in an amount of from about 40 to about 1 weight percent, said weight percents being based on the total weight of the monomer mixture.

3. The particulate of claim 2 wherein the monomer or monomers copolymerizable with the vinylidene chloride are selected from the group consisting of vinyl chloride, alkyl acrylates, alkyl methacrylates, acrylic acid, methacrylic acid, itaconic acid, acrylonitrile, and methacrylonitrile.

4. The particulate of claim 1, wherein the processing aid is coated on the vinylidene chloride interpolymer surface at a level of between about 0.001 and about 2 weight percent, based on the total weight of the particle.

5. The particulate of claim 4, wherein the processing aid is coated on the vinylidene chloride interpolymer surface at a level of between about 0.01 and about 1.5 weight percent, based on the total weight of the particulate.

6. The particulate of claim 5, wherein the processing aid is coated on the vinylidene chloride interpolymer surface at a level of between about 0.1 and about 0.7 weight percent, based on the total weight of the particle.

7. The particulate of claim 1, wherein the metallic salts of fatty acids are selected from the group consisting of calcium stearate, magnesium stearate, sodium stearate, and sodium lauryl sulfate.

8. The particulate of claim 1, wherein the olefin polymer is selected from the group consisting of polymers of α-monoolefins and substituted α-monoolefins.

9. The particulate of claim 8 wherein the α-monoolefins polymers include polyethylene, polypropylene, poly(butene-1), poly(isobutylene), poly(1-pentene), poly(1-hexene), and poly(1-octene).

10. The particulate of claim 1, wherein the polyolefin wax is selected from the group consisting of paraffin waxes, nonoxidized polyethylene waxes, and oxidized polyethylene waxes.

11. The particulate of claim 1, wherein the vinylidene chloride interpolymer surface is coated with sodium lauryl sulfate and magnesium stearate.

12. A coated particulate, in the form of a powder or in the form of a pellet, of extrudable thermoplastic material, the particulate comprising vinylidene chloride interpolymer, and being coated with at least one processing aid, wherein the vinyldene chloride interpolymer is formed from a monomer mixture which comprises vinylidene chloride monomer in an amount of from about 60 to about 99 weight percent and at least one ethylenically unsaturated comonomer copolymerizable therewith in an amount of from about 40 to about 1 weight percent, said weight percents being based on the total weight of the monomer mixture, and the processing aid is selected from the group consisting of, fatty esters, wax esters, glycerol esters, glycol esters, fatty alcohol esters, fatty alcohols, fatty amides, metallic salts of fatty acids, olefin polymers and polyolefin waxes, at a level of between about 0.1 and about 0.7 weight percent, based on the total weight of the particulate.

13. An improved process for making a fabricated article, said process comprising
(1) providing a coated particulate, in the form of a powder or in the form of a pellet, of extrudable thermoplastic material, the particulate comprising vinylidene chloride interpolymer, and being coated with at least one processing aid selected from the group consisting of fatty esters, wax esters, glycerol esters, glycol esters, fatty alcohol esters, fatty alcohols, fatty amides, metallic salts of fatty acids, olefin polymers and polyolefin waxes, at a level effective to improve the extrudability of the vinylidene chloride interpolymer; and (2) fabricating the particulate into an article using a method selected from the group consisting of feedblock coextrusion, multimanifold die coextrusion; injection molding; extrusion molding; and lamination techniques, or combinations thereof.

14. An improved process for making a fabricated article, said process comprising the following steps:

(1) providing a coated particulate, in the form of a powder or in the form of a pellet, of extrudable thermoplastic material, the particulate comprising vinylidene chloride interpolymer, and being coated with at least one processing aid, wherein the vinylidene chloride interpolymer is formed from a monomer mixture which comprises vinylidene chloride monomer in an amount of from about 60 to about 99 weight percent and at least one ethylenically unsaturated comonomer copolymerizable therewith in an amount of from about 40 to about 1 weight percent, said weight percents being based on the total weight of the monomer mixture, and the processing aid is selected from the group consisting of, fatty esters, wax esters, glycerol esters, glycol esters, fatty alcohol esters, fatty alcohols, fatty amides, metallic salts of fatty acids, olefin polymers and polyolefin waxes; at a level of between about 0.1 and about 0.7 weight percent, based on the total weight of the pellet; and (2) fabricating the particulate into an article using a method selected from the group consisting of feedblock coextrusion, multimanifold die coextrusion; injection molding; extrusion molding; and lamination techniques, or combinations thereof.

15. The coated particulate of claim 1 wherein the processing aid is fused on the vinylidene chloride interpolymer surface.

* * * * *